(12) United States Patent
Liu et al.

(10) Patent No.: US 12,400,091 B2
(45) Date of Patent: Aug. 26, 2025

(54) LABEL PRINTER AND CONTROL METHOD THEREOF

(71) Applicant: Wuhan Jingchen Intelligent Identification Technology Co., Ltd., Wuhan (CN)

(72) Inventors: Xiong Liu, Hanchuan (CN); Jianwen Jiang, Wuhan (CN); Hu Zhang, Wuhan (CN); Quan Zhou, Wuhan (CN); Yongqiang Zhang, Wuhan (CN); Hao Yu, Wuhan (CN)

(73) Assignee: Wuhan Jingchen Intelligent Identification Technology Co., Ltd., Wuhan (CN)

( * ) Notice: Subject to any disclaimer, the term of this patent is extended or adjusted under 35 U.S.C. 154(b) by 0 days.

(21) Appl. No.: 18/428,504

(22) Filed: Jan. 31, 2024

(65) Prior Publication Data
US 2025/0021776 A1   Jan. 16, 2025

(30) Foreign Application Priority Data

Jul. 13, 2023   (CN) .......................... 202310854885.0

(51) Int. Cl.
| | |
|---|---|
| G06K 7/10 | (2006.01) |
| B41J 3/407 | (2006.01) |
| B41J 11/00 | (2006.01) |
| B41J 15/02 | (2006.01) |
| B41J 15/04 | (2006.01) |

(52) U.S. Cl.
CPC ........ *G06K 7/10366* (2013.01); *B41J 3/4075* (2013.01); *B41J 11/009* (2013.01); *B41J 11/0095* (2013.01); *B41J 15/02* (2013.01); *B41J 15/044* (2013.01); *B41J 15/048* (2013.01)

(58) Field of Classification Search
None
See application file for complete search history.

(56) References Cited

FOREIGN PATENT DOCUMENTS

JP          2012076358 A  *  4/2012

* cited by examiner

*Primary Examiner* — Kristy A Haupt
(74) *Attorney, Agent, or Firm* — Rhodes IP PLC; Christopher R. Rhodes

(57) ABSTRACT

Disclosed is a label printer and a control method thereof. The label printer includes a paper cartridge configured to hold a label roll paper unit including a tube core and a continuous paper, wherein the tube core is provided with an RFID tag; an RFID reader configured to read information stored on the RFID tag; and a controller configured to detect whether the RFID reader reads the stored information of the RFID tag when the label roll paper unit is in an initial position, and if the RFID reader is unable to read the stored information of the RFID tag, the controller controls the label roll paper unit to rotate and drive the RFID tag to rotate, and controls the RFID reader to continuously read the RFID tag during rotating until the RFID reader is able to read the stored information.

8 Claims, 4 Drawing Sheets

```
detect whether the RFID reader reads the stored informa
tion of the RFID tag when the label roll paper unit is in
an initial position
```

```
if the RFID reader is unable to read the stored
information of the RFID tag, controlling the
label roll paper unit to rotate to drive the
RFID tag to rotate, and during rotating,
controlling the RFID reader to
read the stored information of the RFID tag until the
RFID reader is able to read the stored information of
the RFID tag
```

LABEL PRINTER AND CONTROL METHOD THEREOF

CROSS-REFERENCE TO RELATED APPLICATIONS

This application claims priority to Chinese Patent Application No. 202310854885.0, filed on Jul. 13, 2023. The disclosure of the application is incorporated herein for all purposes by reference in its entirety.

TECHNICAL FIELD

The present disclosure belongs to the field of label printer, and more specifically, relates to a label printer and a control method thereof.

BACKGROUND

Label printers are widely used in scenarios such as supermarket retail, industrial production, express delivery, clothing, office management, etc. A user can use a label printer to print labels.

In the prior art, in order to improve the printing effect and user experience, an RFID tag is added to the label roll paper used in the label printer. The RFID tag contains detailed information about the label roll paper. The label printer is provided with an RFID reader, by means of which the information in the RFID tag is read and some parameters of the label printer may be adjusted.

As shown in FIG. 1, in order to ensure normal operations of reading and writing, an RFID tag may be parallel to and face an RFID reader. In this case, a current flowing through the RFID reader antenna changes, so that a magnetic field with varying strengths over time is generated. The changing magnetic field leads to changes in magnetic flux through a coil on the RFID tag, causing the coil to produce an induced current, which supplies power to a chip on the RFID tag for communication of the RFID reader and the RFID tag. Projected area of the RFID tag onto the RFID reader antenna affects the read of the RFID reader to the RFID tag. RFID reader has a certain recognition blind zone. If the projected area of the RFID tag onto the RFID reader antenna is small, the flux change through the coil on the RFID tag is small, and the resulting induced current is insufficient for the normal operation of the chip on the RFID tag, resulting in RFID reader being unable to normally read the RFID tag information.

SUMMARY

In view of the above defects of the prior art or the need for improvement, the present disclosure provides a label printer and its control method, which can automatically avoid a recognition blind zone, greatly improving the success rate of RFID information reading.

In accordance with an aspect of the present disclosure, there is provided a label printer comprising:
  a paper cartridge configured to hold a label roll paper unit including a tube core and a continuous paper, wherein the tube core is provided with an RFID tag;
  an RFID reader configured to read information stored on the RFID tag; and
  a controller configured to detect whether the RFID reader reads the stored information of the RFID tag when the label roll paper unit is in an initial position, and if the RFID reader is unable to read the stored information of the RFID tag, the controller controls the label roll paper unit to rotate and drive the RFID tag to rotate, and controls the RFID reader to continuously read the RFID tag in the process of rotation until the RFID reader is able to read the stored information of the RFID tag.

According to one or more embodiments, the label printer further comprises a conveying assembly for conveying the continuous paper in a first direction or a second direction, wherein the first direction is configured as a paper-out direction, and the second direction is configured as a paper-in direction, and wherein the controller drives the label roll paper unit to rotate by controlling the conveying assembly to convey the continuous paper in the first direction.

According to one or more embodiments, the label printer further comprises a printing positioning sensor, and the continuous paper includes a substrate paper and a plurality of labels attached to the substrate paper, when the label roll paper unit is in the initial position, if the RFID reader is able to read the stored information of the RFID tag, the conveying assembly is controlled to convey the continuous paper in the first direction, and upon the printing positioning sensor detects a gap area adjacent from the label of the continuous paper, the conveying of the continuous paper in the first direction is stopped, and the continuous paper is returned a distance S in the second direction for performing printing, wherein $S=S_1-S_2$, where S is a return distance, $S_1$ is a length of a single label of the continuous paper in the first direction, and $S_2$ is a travel distance from the printing positioning sensor to a print line of a print head of the label printer.

According to one or more embodiments, a maximum rotation angle of the RFID tag is greater than a blind zone angle of the RFID reader, and the blind zone angle is a maximum rotation angle of the label roll paper unit within a period of time during which the RFID reader is unable to read the stored information of the RFID tag.

According to one or more embodiments, the blind zone angle is predetermined by testing.

According to one or more embodiments, the maximum rotation angle of the label roll paper unit is controlled by controlling a maximum conveyance length of the continuous paper delivered by the conveying assembly in the first direction.

According to one or more embodiments, during rotating, if the RFID reader is detected to be able to read the stored information of the RFID tag, the conveying assembly is controlled to convey the continuous paper in the second direction, so that the label roll paper unit is returned to the initial position before rotation.

According to one or more embodiments, the label printer further comprises a printing positioning sensor, and the continuous paper includes a substrate paper and a plurality of labels attached to the substrate paper, after the label roll paper unit is returned to the initial position before rotation, the conveying assembly is controlled to convey the continuous paper in the first direction, and upon the printing positioning sensor detects a gap area adjacent from the label of the continuous paper, the conveying of the continuous paper in the first direction is stopped, and the continuous paper is returned a distance S in the second direction for performing printing, wherein $S=S_1-S_2$, where S is a return distance, $S_1$ is a length of a single label of the continuous paper in the first direction, and $S_2$ is a travel distance from the printing positioning sensor to a print line of a print head of the label printer.

According to one or more embodiments, the RFID tag is provided on an inner or outer wall of the tube core.

In accordance with another aspect of the present disclosure, there is provided a control method for a label printer, wherein the label printer includes a paper cartridge and an RFID reader, the paper cartridge is used to hold a label roll paper unit including a tube core and a continuous paper, the tube core is provided with an RFID tag, and the RFID reader is used to read information stored on the RFID tag, the control method comprising steps of: detecting whether the RFID reader is capable of reading the stored information of the RFID tag when the label roll paper unit is in an initial position; and if the RFID reader is unable to read the stored information of the RFID tag, controlling the label roll paper unit to rotate to drive the RFID tag to rotate, and, during rotating, controlling the RFID reader to re-read the stored information of the RFID tag until the RFID reader is able to read the stored information of the RFID tag.

Overall, the above technical solutions contemplated by the present disclosure have beneficial effects compared to the prior art:

(1) in a recognition blind zone in which an RFID reader is unable to read, by controlling the tube core of the label roll paper unit to rotate, an RFID tag is rotated to avoid the recognition blind zone, which greatly improves the success rate of RFID tag reading; and
(2) the printer carries out the paper-out and paper-return operations when the label roll paper is inserted, aligning with the actions of avoiding the blind zone. A user may not perceive the process of avoiding the blind zone, which further improves the user experience.

DETAILED DESCRIPTION

Figure 1:
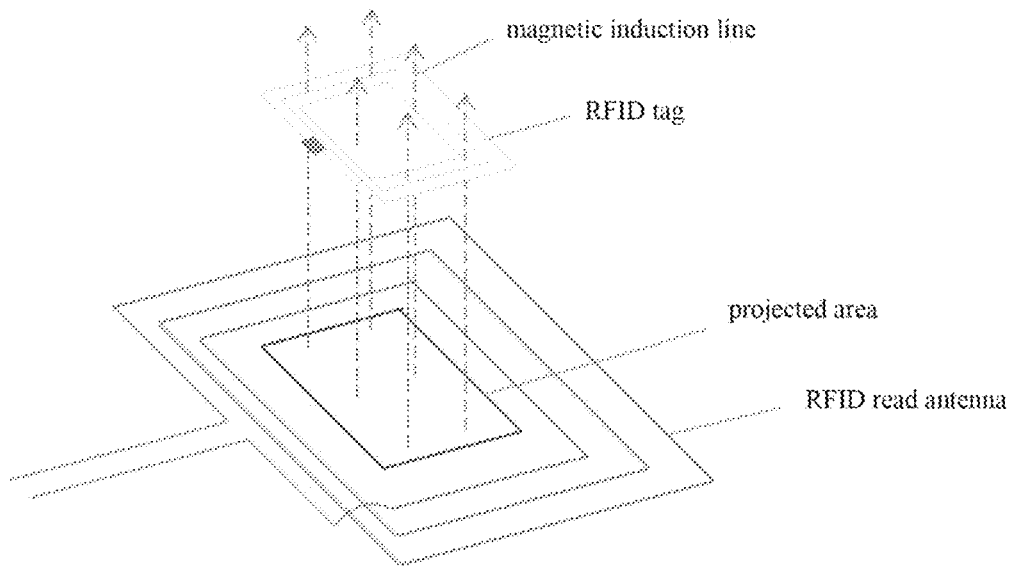
FIG. 1 shows a working principle of an RFID tag in prior art.

In order to make the objects, technical solutions and advantages of the present disclosure clearer, the present disclosure is hereinafter described in further detail in conjunction with the accompanying drawings and embodiments. It should be understood that the specific embodiments described herein are only for the purpose of explaining the present disclosure, and are not intended to limit the present disclosure. In addition, the technical features involved in the various embodiments of the present disclosure described below may be combined with each other as long as they do not conflict with each other.

Furthermore, terms "first" and "second" are used for descriptive purposes and are not to be construed as indicating or implying priority or number of technical features indicated. Thus, a feature defined with the terms "first", "second" may expressly or implicitly include at least one such feature. In the description of the present disclosure, "a plurality of" means at least two, e.g., two, three, etc., unless otherwise expressly and specifically limited.

Embodiments of the present disclosure provide a label printer and a method of controlling the same, each of which is described below.

A label printer according to an embodiment includes a paper cartridge, an RFID reader and a controller.

The paper cartridge is used for holding a label roll paper unit including a tube core and a continuous paper, the tube core is provided with an RFID tag.

The RFID reader is used for reading information stored on the RFID tag. The RFID reader may be disposed at a bottom of the paper cartridge.

The controller is used for detecting whether the RFID reader reads the stored information of the RFID tag when the label roll paper unit is in an initial position, and controls the label roll paper unit and thus the RFID tag to rotate if the RFID reader is unable to read the stored information of the RFID tag, and controls the RFID reader to re-read the RFID tag in the process of rotation. For example, the RFID reader carries out a read operation at a certain frequency until the RFID reader can read the stored information of the RFID tag.

According to one or more embodiments of the present disclosure, the RFID reader may be in a recognition blind zone or an unreadable state in which the RFID reader is unable to read. By controlling the tube core of the label roll paper to rotate, the RFID tag will rotate to avoid the recognition blind zone or unreadable state and successfully read the stored information of the RFID tag. It is particularly advantageous for the label roll paper when the RFID tag is provided on an inner or outer wall of the tube core.

The following examples where an RFID tag is provided on an inner or outer wall of the tube core of a label roll are provided.

The label roll paper is placed into the paper cartridge of the label printer, and a top cover of the label printer is closed. The position where the label roll paper is placed by a user is an initial position of the label roll paper. In the prior art, in order to avoid the unreadable state, the user is required to observe and rotate the label roll paper to carry out alignment operation such that read or recognition is allowed after the position is correctly aligned. In the embodiments of the present disclosure, the user can casually place the label roll paper into the paper cartridge of the label printer, and the alignment operation is not necessary.

According to one or more embodiments, the label printer further includes a conveying assembly for conveying the continuous paper in a first direction (a paper-out direction) or a second direction (a paper-in direction), the controller drives the label roll paper to rotate by controlling the conveying assembly to convey the continuous paper in the first direction. That is, by rolling out the continuous paper, the rotation of the RFID tag is achieved.

According to one or more embodiments, the label printer further includes a printing positioning sensor, the continuous paper includes a substrate paper and a plurality of labels adhered to the substrate paper. When the label roll paper is in the initial position, if the RFID reader is capable of reading the stored information of the RFID tag, the conveying assembly is controlled to convey the continuous paper in the first direction. When the printing positioning sensor detects a gap area adjacent from the label of the continuous paper, the conveying of the continuous paper in the first direction is stopped, and the continuous paper is returned a distance S in the second direction for performing printing. $S=S_1-S_2$, wherein S is a return distance, where $S_1$ is a length of a single label of the continuous paper in the first direction, and $S_2$ is a travel distance from the printing positioning sensor to a print line of a print head of the label printer. This avoids wastage of label papers.

If it is detected that the RFID reader is unable to read the stored information of the RFID tag, the controller controls the label roll paper to rotate to drive the RFID tag to rotate, and, in the process of rotating, controls the RFID reader to continuously try to read the RFID tag until the RFID reader is able to read the stored information of the RFID tag.

Figure 2:
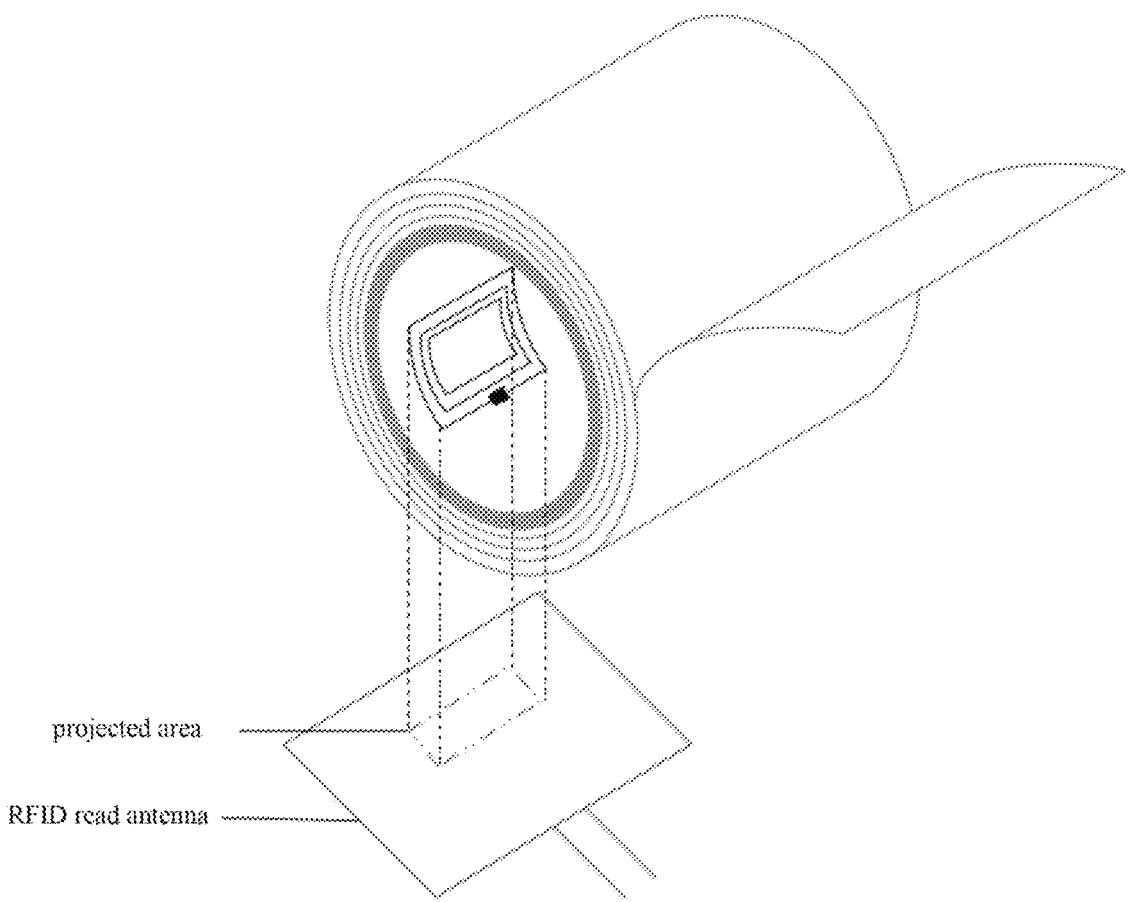
FIG. 2 shows an RFID tag within a recognition blind zone.

As shown in FIG. 2, the label roll paper is in the initial position. If the label roll paper is in the unreadable state, a projected area of the RFID tag with respect to the antenna plane is small, changes of magnetic flux through a coil on the RFID tag are small, and the resulting induced current is insufficient to supply normal operations for a chip on the RFID tag, resulting in RFID reader failing to read the RFID tag information.

Figure 3:
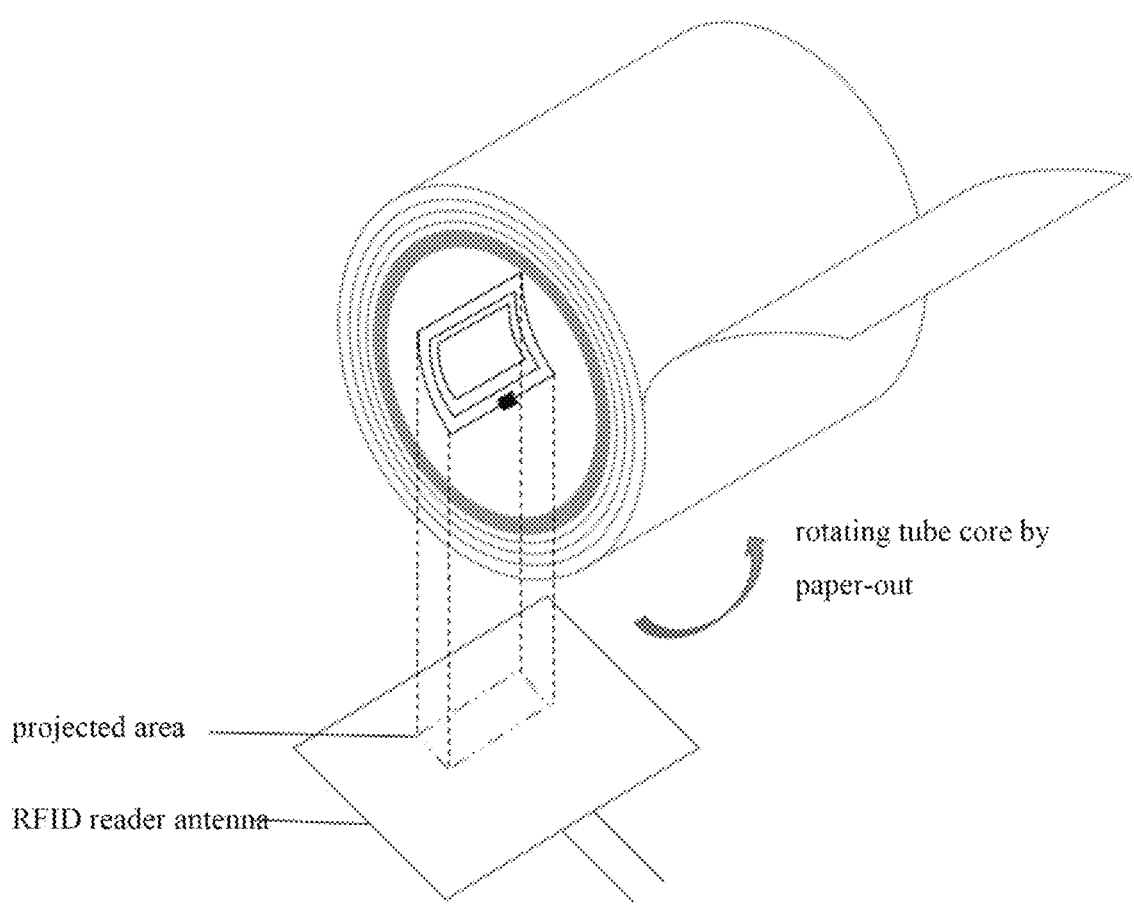
FIG. 3 shows a rotating RFID tag within a recognition blind zone.

As shown in FIG. 3, at this time, the label printer continuously conveys paper out and drives the tube core to rotate, so that the RFID tag attached to the tube core rotates, and RFID reader continuously tries to read the RFID tag information during the rotation of the tube core. When the RFID tag rotates, the projection area increases such that generated inductive current is sufficient to supply the chip on the RFID tag to work, and the RFID reader can read the information stored in the RFID tag.

According to one or more embodiments, a maximum rotation angle of the RFID tag is greater than a blind zone angle of the RFID reader. Blind zone angle is defined as a maximum rotation angle of the label roll paper within a period of time during which the RFID reader is unable to read the stored information of the RFID tag. In other words, a blind zone angle may be an angle from a first position to a second position. In the first position, the RFID reader switches from a state that it is able to read the RFID tag to a state that that it is unable to read the RFID tag. In the second position, the RFID reader switches from a state that it is unable to read the RFID tag to a state that it is able to read the RFID tag.

Depending on types of label roll paper, an antenna size of the RFID tag may be different, resulting in a different blind zone angle. The blind zone angle can be determined in advance by testing.

Take a rectangle RFID tag of 56 mm×18 mm as an example, it has a maximum blind zone angle of about 47.4° according to actual measurement of rotation of the tube core. The RFID tag may have a maximum rotation angle of greater than 47.4°, such as 142.2°, such that the RFID tag can be recognized after the label roll paper is inserted into the printer. When the RFID reader is able to read the stored information of the RFID tag, the rotation is stopped (it is not necessary to rotate by) 142.2°. In some cases that the RFID tag has been rotated by 142.2° and the stored information of the RFID tag has not been read, the rotation may also be stopped, as the RFID tag may be damaged or experiencing issues preventing successful reading.

According to one or more embodiments, the maximum rotation angle of the label roll paper is controlled by controlling a maximum conveyance length of the continuous paper delivered by the conveying assembly in the first direction.

For example, the maximum conveyance length is set as 60 mm, i.e., the label printer conveys paper out up to 60 mm (which corresponds to a rotation angle of 142.2° of the tube core). If the initial position where the label roll paper is firstly placed into the label printer is not within the blind zone, the RFID tag can be recognized. If the initial position where the label roll paper is firstly placed into the label printer is within the blind zone, the printer continuously conveys the paper out. The maximum conveyance length of 60 mm leads to a rotation angle of the tube core much larger than the blind zone angle of 47.4°, which ensures that the RFID tag can be recognized after the label roll paper is inserted into the label printer.

Figure 4:
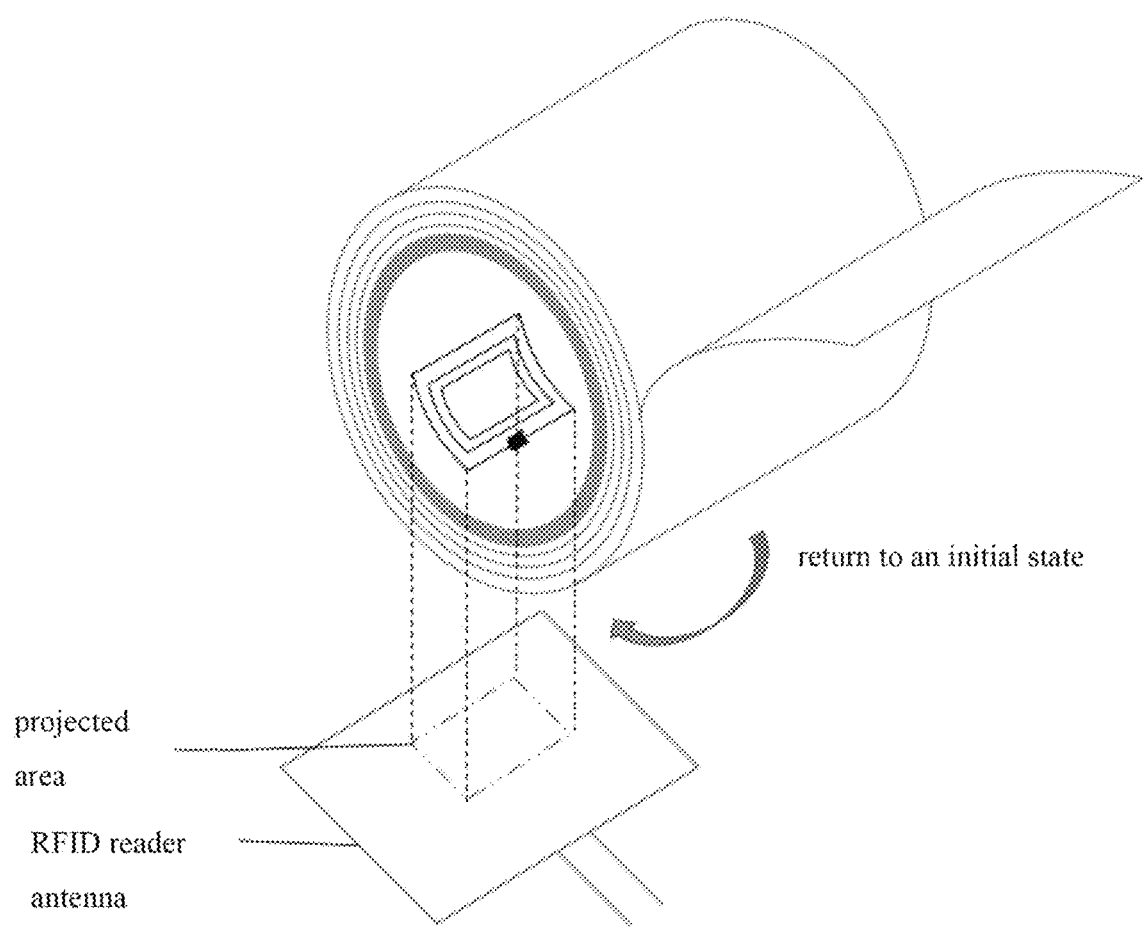
FIG. 4 shows a rotating RFID tag after being read.

As shown in FIG. 4, further, if during rotation, the RFID reader is detected to be able to read the stored information of the RFID tag, the conveying assembly is controlled to convey the continuous paper in the second direction, so that the label roll paper is returned to its initial position before rotation. That is, the label printer stops moving paper out and returns the paper to the initial state in which the label roll is initially placed.

Specifically, the conveying assembly includes a motor, a set of gears and a rubber roller. When the information of the RFID tag is successfully acquired, the RFID reader is turned off, the motor stops rotating and the number of steps X in which the motor rotates during conveying continuous paper in the first direction is recorded. After that, the motor is reversed by the same number of steps X, so as to drive the label roll paper back to the initial position where the user originally placed the paper.

According to one or more embodiments, after the label roll paper is returned to its initial position before rotation, controlling the conveying assembly to convey the continuous paper in the first direction. When the printing positioning sensor detects a gap area adjacent from the label of the continuous paper, the conveying of the continuous paper in the first direction is stopped and the continuous paper is returned a distance S in the second direction to perform printing. $S=S_1-S_2$, wherein S is a return distance, where $S_1$ is a length of a single label of the continuous paper in the first direction, and $S_2$ is a travel distance from the printing positioning sensor to a print line of a print head of the label printer. That is, after returning the paper to the initial state when the label roll paper is placed, paper-out and paper-return operations may be performed as when it is not in the recognition blind zone.

According to one or more embodiments of the present disclosure, RFID tag is attached to the tube core, which allows automatically avoiding the blind zone. The tube core may secure the label roll paper by extending through it, which ensures printing effect.

In addition, the printer carries out the paper-out and paper-return operations when the label roll paper is inserted, aligning with the actions of avoiding the blind zone. A user may not perceive the process of avoiding the blind zone, which further improves the user experience.

Figure 5:
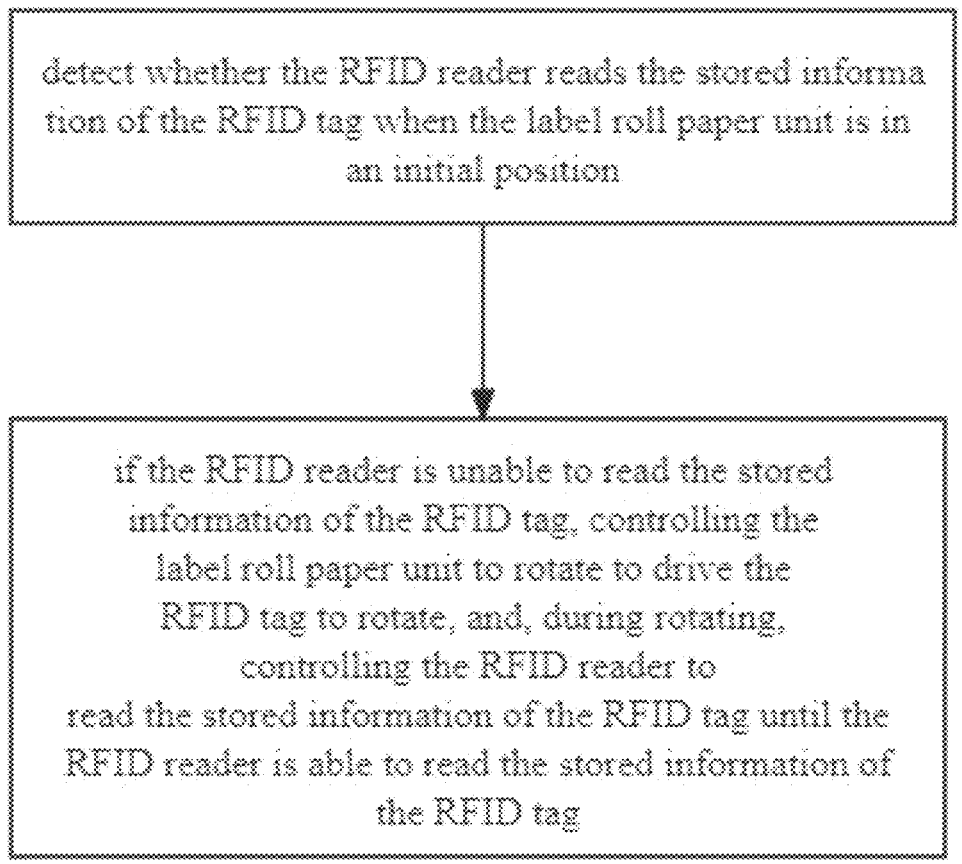
FIG. 5 shows a flow chart of a control method for a label printer.

FIG. 5 shows a control method for a label printer, wherein the label printer includes a paper cartridge and an RFID reader, the paper cartridge is used to hold label roll paper, the label roll paper includes a tube core and a continuous paper, the tube core is provided with an RFID tag, and the RFID reader is used to read the stored information of the RFID tag.

The control method comprises the steps of: detecting whether the RFID reader reads the stored information of the RFID tag when the label roll paper is in an initial position; and if the RFID reader is unable to read the stored information of the RFID tag, controlling the label roll paper to rotate to drive the RFID tag to rotate, and controlling the RFID reader to re-read the information of the RFID tag in the process of rotation until the RFID reader is able to read the stored information of the RFID tag.

The method of controlling the label printer can be understood according to the working principle and effect of the label printer described above.

Those of ordinary skill in the art will appreciate that the embodiments described herein are intended to assist readers in understanding the principles of the present disclosure. Those skilled in the art can make various other specific modifications and combinations without departing from the present disclosure according to the technical teaching disclosed in the present disclosure, and these modifications and combinations still fall within the protection scope of the present disclosure.

What is claimed is:

1. A label printer, comprising:
   a paper cartridge configured to hold a label roll paper unit including a tube core and a continuous paper, wherein the tube core is provided with an RFID tag;
   an RFID reader configured to read information stored on the RFID tag;
   a conveying assembly for conveying the continuous paper in a first direction or a second direction, wherein the first direction is configured as a paper-out direction, and the second direction is configured as a paper-in direction; and
   a controller configured to detect whether the RFID reader reads the stored information of the RFID tag when the label roll paper unit is in an initial position, wherein if the RFID reader is unable to read the stored information of the RFID tag, the controller controls the conveying assembly to convey the continuous paper in the first direction to drive the label roll paper unit to rotate and drive the RFID tag to rotate, and controls the RFID reader to continuously read the RFID tag in the process of rotation until the RFID reader is able to read the stored information of the RFID tag, and wherein during rotating, if the RFID reader is detected to be able to read the stored information of the RFID tag, controlling the conveying assembly to convey the continuous paper in the second direction, so that the label roll paper unit is returned to the initial position before rotation.

2. The label printer according to claim 1, further comprises a printing positioning sensor, and the continuous paper includes a substrate paper and a plurality of labels attached to the substrate paper,
   when the label roll paper unit is in the initial position, and if the RFID reader is able to read the stored information of the RFID tag, the conveying assembly is controlled to convey the continuous paper in the first direction, and upon the printing positioning sensor detects a gap area adjacent from the label of the continuous paper, the conveying of the continuous paper in the first direction is stopped, and the continuous paper is returned a distance S in the second direction for performing printing, wherein $S=S_1-S_2$, where S is a return distance, $S_1$ is a length of a single label of the continuous paper in the first direction, and $S_2$ is a travel distance from the printing positioning sensor to a print line of a print head of the label printer.

3. The label printer according to claim 1, wherein a maximum rotation angle of the RFID tag is greater than a blind zone angle of the RFID reader, the blind zone angle is a maximum rotation angle of the label roll paper unit within a period of time during which the RFID reader is unable to read the stored information of the RFID tag.

4. The label printer according to claim 3, wherein the blind zone angle is predetermined by testing.

5. The label printer according to claim 1, wherein the maximum rotation angle of the label roll paper unit is controlled by controlling a maximum conveyance length of the continuous paper delivered by the conveying assembly in the first direction.

6. The label printer according to claim 1, further comprising a printing positioning sensor, and the continuous paper includes a substrate paper and a plurality of labels attached to the substrate paper, after the label roll paper unit is returned to the initial position before rotation, the conveying assembly is controlled to convey the continuous paper in the first direction, and upon the printing positioning sensor detects a gap area adjacent from the label of the continuous paper, the conveying of the continuous paper in the first direction is stopped, and the continuous paper is returned a distance S in the second direction for performing printing, wherein $S=S_1-S_2$, S is a return distance, where $S_1$ is a length of a single label of the continuous paper in the first direction, and $S_2$ is a travel distance from the printing positioning sensor to a print line of a print head of the label printer.

7. The label printer according to claim 1, wherein the RFID tag is provided on an inner or outer wall of the tube core.

8. A control method for a label printer, wherein the label printer includes a paper cartridge and an RFID reader and a conveying assembly wherein the paper cartridge is used to hold a label roll paper unit including a tube core and a continuous paper, the tube core is provided with an RFID tag, the RFID reader is used to read information stored on the RFID tag, and the conveying assembly is used to convey the continuous paper in a first direction or a second direction, wherein the first direction is configured as a paper-out direction, and the second direction is configured as a paper-in direction, the control method comprising steps of:
   detecting whether the RFID reader is capable of reading the stored information of the RFID tag when the label roll paper unit is in an initial position;
   if the RFID reader is unable to read the stored information of the RFID tag, controlling the conveying assembly to convey the continuous paper in the first direction to drive the label roll paper unit to rotate and drive the RFID tag to rotate, and, during rotating, controlling the RFID reader to re-read the stored information of the RFID tag until the RFID reader is able to read the stored information of the RFID tag; and
   during rotating, if the RFID reader is detected to be able to read the stored information of the RFID tag, controlling the conveying assembly to convey the continuous paper in the second direction, so that the label roll paper unit is returned to the initial position before rotation.

* * * * *